May 27, 1958 G. M. RAPATA 2,836,216
PLASTIC SLIP-ON NUT WITH RESILIENT FLANGES
Filed Oct. 15, 1954 2 Sheets-Sheet 1
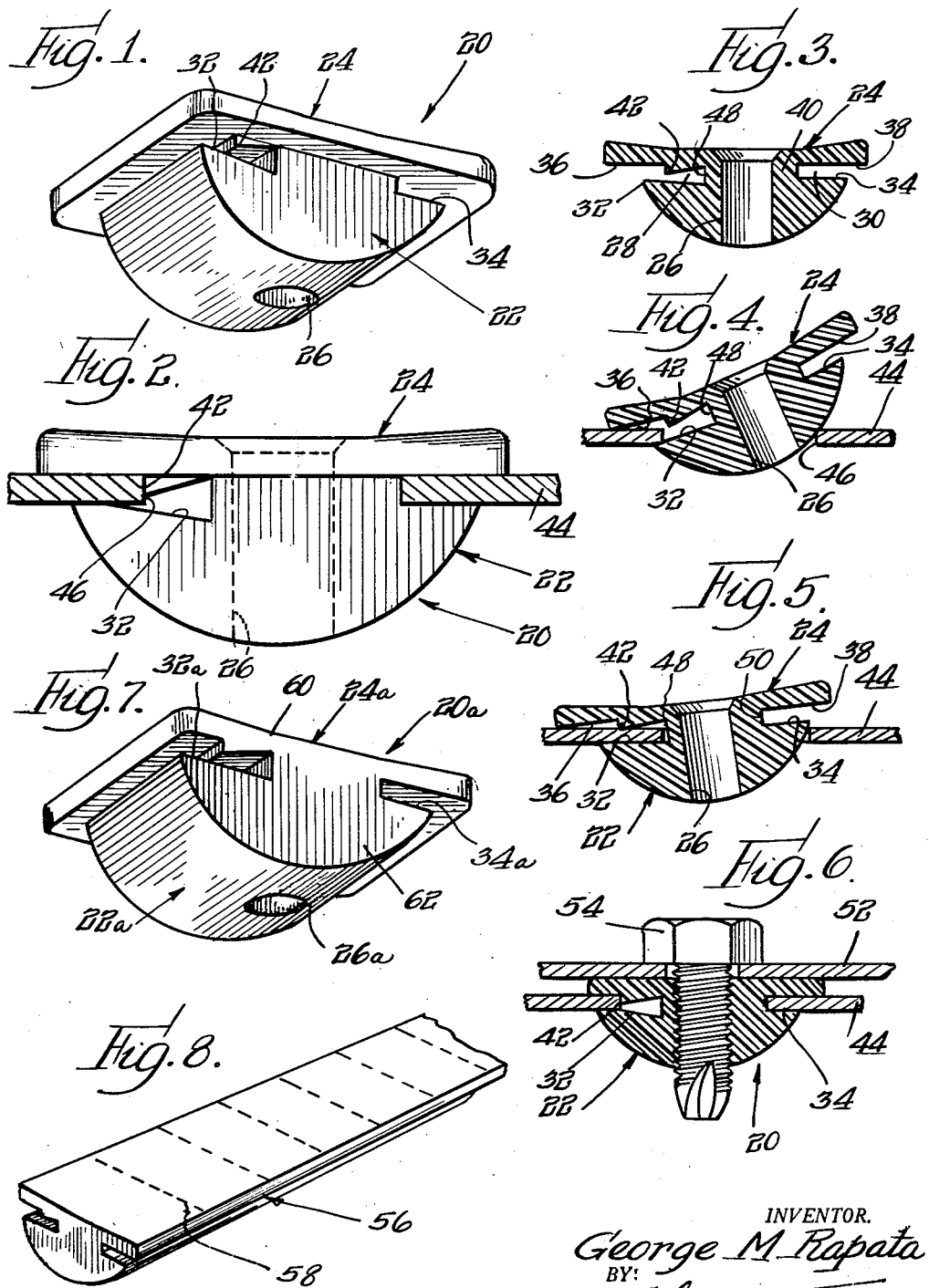
INVENTOR.
George M. Rapata
BY Olson & Trexler
Attys.

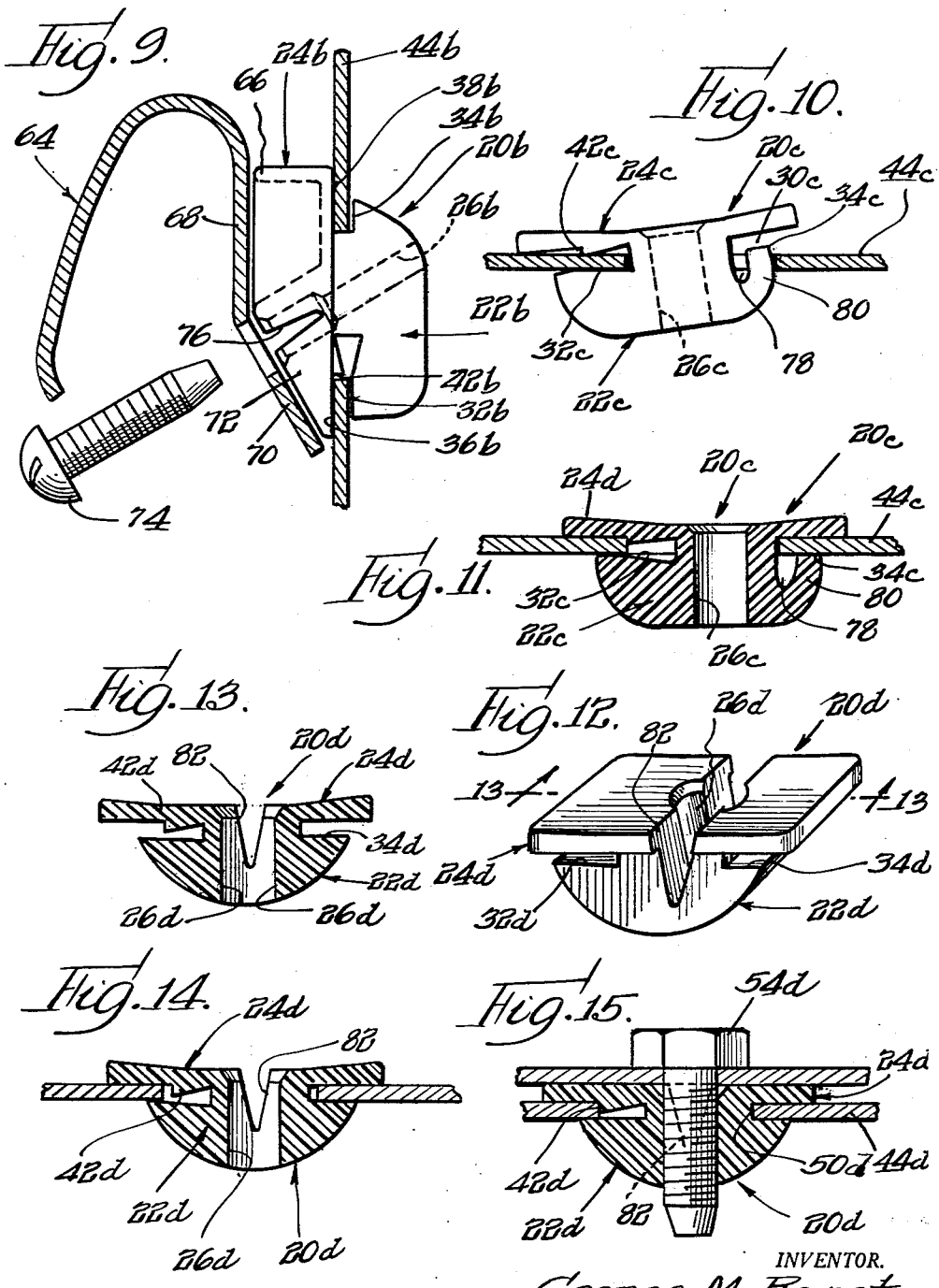

United States Patent Office 2,836,216
Patented May 27, 1958

2,836,216

PLASTIC SLIP-ON NUT WITH RESILIENT FLANGES

George M. Rapata, Chicago, Ill., assignor to Illinois Tool Works, Chicago, Ill., a corporation of Illinois Application October 15, 1954, Serial No. 462,545

5 Claims. (Cl. 151—41.75)

The present invention relates to novel fastening devices and more particularly to novel nut members adapted to be applied to apertured panels and the like.

As will be understood, there are many installations wherein it is desirable to provide a nut behind an apertured panel for receiving a screw member which is used to mount various articles such as handles, trim pieces or other panels to the panel. In many of these installations, the back side of the supporting panel is inaccessible, so that some type of securing device must be inserted through the aperture and then positioned behind the panel. Many of these installations are found in appliances such as stoves, refrigerators, and washing machines, which include enameled panels so that caution must be exercised in order to avoid scratching or chipping of the enamel.

An important object of the present invention is to provide a novel one-piece plastic nut member which may be easily slipped onto an apertured panel from the front of the panel without danger of injuring the panel or any finish such as enamel thereon.

Another object of the present invention is to provide a novel one-piece plastic nut member which may be readily assembled through an apertured panel without pounding or without using other means of forcing the nut member which might injure the panel.

Still another object of the present invention is to provide a novel one-piece nut member of the above described type, which is formed so as to preclude accidental disassembly thereof from an apertured panel.

Still another object of the present invention is to provide a novel one-piece plastic fastener of the above described type, which is constructed so that it will be relatively located in a predetermined manner with respect to the edges of an aperture in a panel.

Another object of the present invention is to provide a novel one-piece plastic nut member of the above described type, which is of simple construction and which may be economically manufactured.

Other objects and advantages of the present invention will become apparent from the following description and the accompanying drawings, wherein:

Fig. 1 is a perspective view of a nut member embodying the principles of this invention;

Fig. 2 is a sectional view showing the nut member of Fig. 1 applied to an apertured panel;

Fig. 3 is a cross-sectional view of the nut member shown in Fig. 1;

Fig. 4 is a cross-sectional view illustrating the manner in which a novel nut member is initially silppped onto an apertured panel;

Fig. 5 is a cross-sectional view similar to Fig. 4, but showing the nut member in further assembled relationship with the apertured panel;

Fig. 6 is a cross-sectional view showing a second panel or other member secured to the apertured panel and nut member assembly by means of a screw;

Fig. 7 is a perspective view of a slightly modified form of the novel nut member;

Fig. 8 is a perspective view showing a length of extruded plastic stock from which the novel nut member shown in Fig. 7 may be formed;

Fig. 9 is a partial sectional view showing another modified nut member applied to an apertured panel and adapted in co-operation with a screw member to mount an article such as a handle to the panel;

Fig. 10 is a partial sectional view showing the manner of assembling another slightly modified nut member with an apertured panel;

Fig. 11 is a view similar to Fig. 10, but showing, in cross section, the nut member fully assembled with the panel;

Fig. 12 is a perspective view showing another modified form of the present invention;

Fig. 13 is a cross-sectional view taken along line 13—13 in Fig. 12;

Fig. 14 is a cross-sectional view showing the novel nut member of Fig. 12 assembled with an apertured panel; and Fig. 15 is a cross-sectional view similar to Fig. 14, but showing a second panel or other article secured to the nut member by means of a screw.

Referring now more specifically to the drawings, wherein like parts are designated with the same numerals throughout the various figures, a nut member 20 embodying one form of the present invention is shown in Figs. 1–6. The nut member 20 is formed as one piece from any suitable plastic material such as nylon.

The nut member 20 includes a body portion 22 and a head portion 24 with a bore 26 extending through these portions and adapted to receive a screw or other complementary fastening device. Slots or recesses 28 and 30 are provided in the nut member between the body and head portions to provide the body portion with work engaging or clamping surfaces 32 and 34, which respectively oppose work engaging or clamping surfaces 36 and 38 on the head portion. Furthermore, the slots or recesses in effect provide the nut member with a short shank 40 between the body and head portions, which shank preferably has an axial length substantially similar to the thickness of the apertured panel to which the nut member is to be applied. It should be noted that the recess or slot 28 is substantially deeper than the recess or slot 30 to enable the nut member to be slipped onto an apertured panel or work piece in the manner described below. Also, the head portion is formed so that the clamping surfaces 36 and 38 thereof project laterally outwardly of their associated clamping surfaces 32 and 34 on the body portion. It should be particularly noted that, in accordance with the present invention, the head portion is provided with a shoulder or abutment 42 which depends from the clamping surface 36 into the slot or recess 28 for the purpose set forth hereinbelow.

As shown in Figs. 2 and 6, the nut member 22 is adapted to be applied to a panel or work piece 44, having an aperture 46 therein. The manner of applying the nut to the apertured panel is shown in Figs. 4 and 5. Referring particularly to Fig. 4, it is seen that the nut member is first tilted and the outer corner of the clamping surface 38 is inserted through the aperture 46 and under the edge of the panel. It will be appreciated that the outer corner of the head portion clamping surface 36 will initially engage the outer surface of the panel whereupon tilting of the nut member for inserting the body portion through the aperture causes the head portion to flex so as to widen the recess or slot 28 sufficiently to permit entry of the panel edge therein. In addition, the clamping surface 32 is inclined downwardly or toward the entering end of the nut from its outer corner to facilitate passage of the panel margin toward the shank portion wall 48 which forms the bottom of the recess 28. As the nut member is slipped onto the marginal edge of the panel, the remainder of the body portion passes through the panel aperture as shown in Fig. 5. In order that the width of the panel aperture may be kept at a minimum, the entering end of the nut body portion is rounded in the manner shown.

When the body portion is fully inserted through the panel aperture, the outwardly extending end of the clamping surface 38 engages the panel and prevents continued movement of the nut member through the aperture. Then the nut member is shifted laterally within the aperture, until a marginal edge of the panel enters the slot or recess 30 and engages the wall 50 of the shank portion which forms the bottom of this recess. The shoulder or abutment 42 is positioned so that when the wall 50 is in engagement with one side of the panel aperture, the shoulder drops into the aperture and engages the opposite side thereof. With this arrangement, it is seen that the nut member is positively located in a predetermined manner within the panel aperture, and since the resiliency of the plastic material of the nut prevents the head portion from flexing away from the panel, the shoulder or abutment 42 precludes the nut member from sliding toward the left as viewed in Figs. 2 or 6, and accidentally becoming disassembled from the panel. From the above description it will be appreciated that the nut member 22 may be easily applied to the panel without pounding and without the use of force, so that any possibility of injury to the panel or the nut member is eliminated. It should also be noted that, in the embodiment shown in Figs. 1–6, the head portion extends laterally outwardly of all four sides of the body portion, so that the aperture in the panel will be completely covered.

When the nut member is assembled with the panel, it may be used for mounting various articles to the panel. For example, in Fig. 6 a second panel 52 is shown mounted to the panel 44 by means of the nut member 22 and a screw member 54. Preferably, the screw receiving bore 26 in the nut member is provided with a smooth, unthreaded wall in order to reduce manufacturing costs. Since the plastic material of the nut is relatively soft, any conventional screw member may be applied thereto, or, if desired, a thread cutting screw of the type illustrated may be used. It should be noted, that the outer opposite ends of the head portion 24 are thickened as compared to the central portion of the head. Thus, upon tightening of the screw member 54, the central portion of the head and body are drawn outwardly until stopped by the panel 52, so that the clamping surfaces 32 and 34 of the head are drawn tightly against the back of the panel 44.

In Fig. 7 there is shown a nut member 20a, which is substantially identical to the above described nut member as indicated by the application of identical reference numerals with the suffix "a" added to corresponding elements. The nut member of this embodiment is especially adapted to be made from an elongated strip 56 of stock material shown in Fig. 8, which strip may be molded or extruded in the form shown. After the strip has been formed, it is cut along the broken lines 58 to provide a plurality of individual nut members. After the strip has been cut, the screw receiving bore 26b may be drilled in each of the nut members, or, if desired, a plurality of bores or apertures 26b may be formed in the strip before it is cut. As a result of this method of forming the nut member 20a, it differs from the above nut member 20 in that the sides 60 of the head portion 24a are co-planer with the sides 62 of the body portion 22a.

Fig. 9 discloses another modified form of the present invention, which is similar to the above described embodiments as indicated by the application of identical reference numerals with the suffix "b" added to corresponding elements. In this embodiment, the head portion 24b is modified so that the nut member is especially adapted for mounting a specific article such as a handle member 64 to the panel 44b. More specifically, the head portion 24b is provided with a relatively thick section 66 along which a portion 68 of the handle may be disposed in substantial parallelism with the panel 44b. The handle is provided with an apertured end section 70, disposed at an angle to the portion 68, and the head portion is provided with a complementary tapered section 72 adapted to accommodate the section 70 of the handle. The bore 26b is disposed at an angle to the axis of the nut member 20b, so as to receive a screw 74 inserted through the aperture in the handle section 70. Since the head portion 24b is relatively thick, it is preferably provided with a V-shaped slot 76 to facilitate flexing thereof during application of the nut member to the apertured panel. If desired, the section 66 of the head portion may be hollowed or recessed, as indicated by the dotted lines, in order to effect a saving of stock material.

In Figs. 10 and 11, there is shown a nut member 20c, embodying a further modified form of the present invention. This nut member differs from the above described nut member 20 in that the body portion 22c is formed with an axially extending recess 78, which communicates with the recess 30c to provide the body portion with a flexible finger or prong 80 having a clamp-surface 34c at its free end. During assembly of the nut member 20c with the apertured panel, the finger or prong 80 flexes inwardly toward the shank portion of the nut as shown in Fig. 10, to facilitate passage of the body through the panel aperture. When the flexible finger or prong passes entirely through the aperture, it springs outwardly to position the clamping surface 34c at least partially beneath the panel. Thus, the marginal edges of the panel automatically enter the slot or recess 30c, and the nut member may be easily shifted to its finally assembled position shown in Fig. 11.

In Figs. 12–15, there is shown a nut member 20d, which illustrates still another modified form of the present invention. The nut member 20d differs from the above described nut member 20 in that it is provided with a V-shaped slot 82 extending through its head portion, its shank portion, and into its body portion. In addition, the screw receiving aperture or bore 26d is formed with a diameter smaller than the diameter of the screw 54d. With this structure, the nut member 20d may be inserted through a slightly oversized aperture in the panel as shown in Fig. 14, and upon application of the screw member to the nut, the opposite sides of the head and shank portions are spread apart by the screw member so that the shoulder 42d and the wall 50d are urged into firm engagement with opposite edges of the panel aperture. As will be understood, in some instances the nut member 20d may be modified by starting the slot 82 at the entering end of the nut rather than at the head end thereof.

From the above description it is seen that the present invention has provided a novel one-piece plastic nut member of simple and economical construction. It is also seen that the novel nut members of this invention may be easily slipped onto an apertured work piece without danger of injuring the work piece. Furthermore, it is seen that the present invention has provided a novel nut member which not only can be easily applied to an apertured work piece or panel, but which also is securely retained in assembled relationship with the panel.

While the preferred embodiments of the present invention have been shown and described herein it is obvious that many structural details may be changed without departing from the spirit and scope of the appended claims.

The invention is claimed as follows:

1. A one-piece resilient plastic nut member adapted to be assembled with an apertured workpiece from one side thereof including a plastic body, a shank extending axially from said body, a head joined with the opposite extremity of said shank, adjacent sections of said body and head on opposite sides of said shank being disposed in superposed relation and separated from each other by work accommodating recesses extending radially inwardly from the outer periphery of the nut member, the head, shank and body being traversed by a screw accommodating aperture positioned substantially centrally of the nut member, the axial thickness of the body adjacent said recess being sufficient to accommodate multiple thread convolutions, the recess separating the body and head on one side of the shank extending toward said screw accommodating aperture to a greater depth than the opposite recess with the distance between the inner edge of the said recess of greater depth and the remote outermost surface of the body being not substantially greater than the corresponding dimension of the workpiece aperture whereby to facilitate initial insertion of the nut to the apertured workpiece, the section of the head in the vicinity of said recess of greater depth being axially yieldable and provided with an abutment extending toward the adjacent superimposed portion of said body and adapted to snap into adjacent relation with the work material defining the work aperture upon final positioning of the nut in said aperture, said shank being non-circular in cross-section so as to cooperate with a complementary aperture in the work in counteracting rotation of the nut member when a screw is rotatably applied thereto.

2. A one-piece resilient plastic nut member as defined by claim 1 in which the head, shank and body are of the same width in a given transverse direction.

3. A one-piece resilient plastic nut member as defined by claim 1 in which the screw accommodating aperture in the vicinity of the head is flared to facilitate the application of a screw fastener to the nut member.

4. A one-piece resilient material nut member, as defined in claim 1, wherein said body portion includes resilient prong means, the shorter of said surfaces providing a terminal end of said prong means, said prong means being adapted to flex inwardly during insertion of the body portion through the work piece aperture, and then spring outwardly to position the shorter surface beneath the work piece.

5. A one-piece resilient material nut member, as defined in claim 1, which includes slot means traversing said nut member between said shoulder means and said oppositely facing wall of the shank portion, so that upon application of a fastening device, such as a screw, to the nut member, said shoulder means and wall will be spread apart and urged into firm engagement with opposite edges of the work piece aperture.

References Cited in the file of this patent

UNITED STATES PATENTS

| | | |
|---|---|---|
| 2,098,997 | Bramming | Nov. 16, 1937 |
| 2,419,071 | Hall | Apr. 15, 1947 |
| 2,552,782 | Hall et al. | May 15, 1951 |
| 2,629,157 | O'Herron | Feb. 24, 1953 |
| 2,665,730 | Trumble | Jan. 12, 1954 |

FOREIGN PATENTS

| | | |
|---|---|---|
| 503,900 | Great Britain | Apr. 17, 1939 |
| 659,926 | Great Britain | Oct. 31, 1951 |
| 689,671 | Great Britain | Apr. 1, 1953 |
| 707,819 | Great Britain | Apr. 21, 1954 |